March 20, 1928.

A. E. SCHEIN 1,662,903

RADIAL BEARING

Filed Sept. 26, 1919

INVENTOR
ALEXANDER E. SCHEIN.
BY
Herbert H. Thompson
HIS ATTORNEY

Patented Mar. 20, 1928.

1,662,903

UNITED STATES PATENT OFFICE.

ALEXANDER E. SCHEIN, OF BROOKLYN, NEW YORK, ASSIGNOR TO THE SPERRY GYROSCOPE COMPANY, OF BROOKLYN, NEW YORK, A CORPORATION OF NEW YORK.

RADIAL BEARING.

Application filed September 26, 1919. Serial No. 326,541.

This invention relates to journal bearings and the lubrication thereof. It has been the practice heretofore to construct bearings so that the internal diameter of the journal receiving portion is greater than the diameter of the journal by a definite fraction of the diameter of the journal, frequently one two-thousandths of the diameter of the journal, in order to provide a space for lubricating fluid between the journal and the bearing. In such constructions the weight of the journal is supported by an oil film of small area, since the distance between the external surface of the journal and the internal surface of the bearing increases on each side of the bottom point of said internal surface. Consequently, when journals supporting heavy loads are employed, the oil film is of insufficient area to support the journal and the oil from the film is gradually squeezed out into the larger space between the journal and bearing, until the bottoms of the journal and bearing come directly into contact with each other, with resultant damage to the bearing. By means of my invention the journal is supported by an oil film of sufficient area to prevent the journal from contacting with the bearing, and at the same time sufficient clearance between the journal and bearing is provided to insure proper cooling by the oil.

My invention has especial application to the bearings for the rotors of large gyroscopes such as used for stabilizing ships. Such bearings present a different problem from the ordinary bearing since the direction of the thrust is constantly changing due both to the changed component of gravity as the gyroscope oscillates and to gyroscopic reaction.

Referring to the drawings wherein I have shown what I now consider to be the preferred forms of my invention:

In a bearing of the ordinary type, the diameter of the bearing exceeding the diameter of the journal by some definite fraction of the diameter of the journal. In such construction the distance between the outer surface of the journal and the inner surface of the bearing increases on each side of the center of pressure at the bottom of the bearing. As a result the weight of the journal is supported by only a small extent of oil film, and the oil beyond, at small distances to each side of the center of pressure, forms no support for the journal since the distance between the journal and bearing beyond these points exceeds the oil film thickness. In cases where the journal carries a load of great weight, as for instance a gyrorotor, the oil film becomes gradually forced out near the center of pressure until the journal contacts with the bearing, whereupon damage to the bearing is the result.

Figure 1:
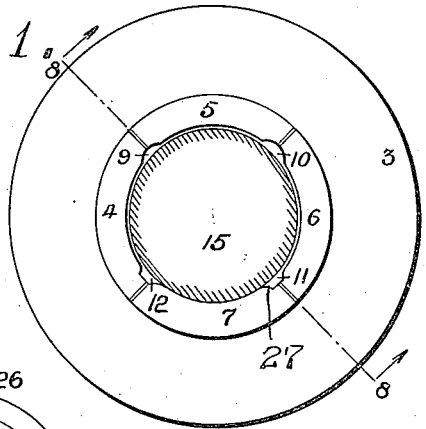
Fig. 1 is a sectional view of one form of my improved bearing.

In order to overcome the objections above pointed out I construct the bearing with an internal curvature which conforms with the curvature of the oil film. To accomplish this I construct the bearing with a diameter equal to the diameter of the journal plus an amount necessary to maintain a required thickness of oil film at all points about the journal. This latter amount, of course, depends upon the thickness of the oil film used, and should be double said thickness. One of the forms which my invention may take is illustrated in Fig. 1.

Figure 2:
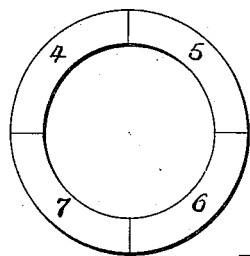
Fig. 2 is a view illustrating the bearing of Fig. 1 after the first step in its construction.
Figure 3:
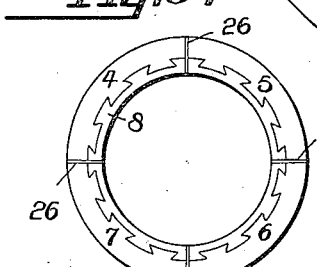
Fig. 3 is a sectional view of the bearing shown in Fig. 1 during the second step in its construction.

In this figure, 3 designates the outer portion of a bearing. The inner portion of said bearing may be composed of sections 4, 5, 6, and 7, preferably each having a lining 8 of Babbitt metal. In the construction of this form of bearing said sections are bored until their internal diameter is equal to the diameter of the journal plus double the oil film thickness, as shown in Fig. 2. In this way the area of the oil film in supporting contact with the journal is greatly increased. If, however, the bearing were utilized in its form as shown in Fig. 2, the oil would become heated rapidly and consequently I enlarge the internal circumference of the bearing sections slightly to provide for a circulation of oil. This may be accomplished as shown in Fig. 3 by driving shims or spacers 26 between said sections until the required diameter is obtained. As a result, the center of curvature of the inner surface of each of said sections is positioned eccentrically to the original center of internal curvature of said sections, which latter center may be termed the center of the bearing. The radius of curvature of each section, of course, remains the same. Grooves or pockets 9, 10, 11, and 12 are preferably provided along the length of the bearing and each groove is in communication with channels 13 and 14 into which oil is pumped. The ends of said grooves adjacent channels 13 are closed while the opposite ends of the grooves are preferably oppositely inclined as at 27 in Fig. 1, and as the journal rotates in either direction it carries oil from one groove to the next. In Fig. 1, assuming the weight of the journal to be directed against section 7, it will be seen that, as the journal rotates in the direction of the arrow, oil entering through groove 12 will be wedged between the inclined surface 27 of said groove and the journal and will be further carried by said journal to form an effective supporting film between the journal and the entire internal area of section 7 forming the working surface. Said oil is, of course, heated considerably and is finally brought into contact with fresh oil pumped through groove 11 and carried around the idle surfaces of blocks 6, 5 and 4, whereby it is cooled.

Figure 4:
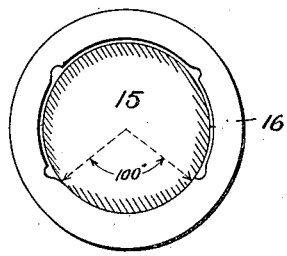
Fig. 4 is a sectional view of a modified form of bearing.

The bearing, instead of being formed from sections, may be constructed in solid form as shown in Fig. 4. The bearing 15 in this figure may be formed by boring by means of a mandrel having a diameter equal to that of the journal 16 plus double the oil film thickness. The diameter may then be enlarged slightly in any suitable way, as by boring, to provide for circulation of the oil. It will be seen that in this figure the journal is supported by the oil film over an angle of about 100°.

Figure 5:
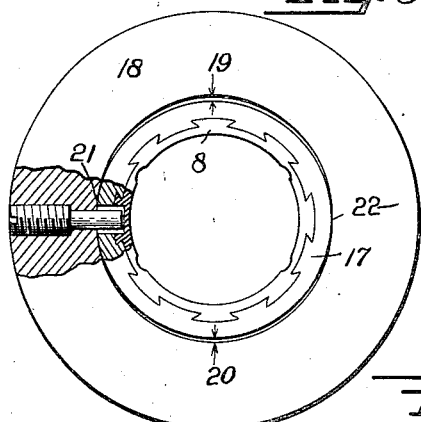
Fig. 5 is a sectional view of another modification.

Another modification of my invention is shown in Fig. 5. In this figure the inner lining 17 of the bearing shell 18 is provided with a diameter equal to the diameter of the journal plus a certain fraction of said diameter, as is the case with the ordinary bearing. In order to prevent the oil film from being squeezed out from between the journal and the inner lining of the bearing, I may make the diameter 19—20 of the shell 18 longer than the diameter 21—22, thus providing a cavity into which the portions of the lining which receive the weight of the journal may give and the oil film thickness still be maintained.

Figure 6:
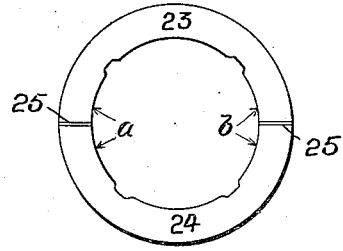
Fig. 6 is a sectional view of another modification.
Figure 7:
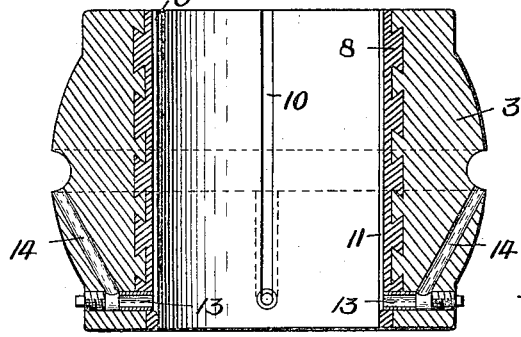
Fig. 7 is a sectional view on line 8—8 of Fig. 1.

In the modification shown in Fig. 6, the bearing comprises two sections 23 and 24, which are bored out to the diameter of the journal plus twice the oil film thickness, and are then separated by shims or spacers 25 of sufficient thickness to provide for the proper oil cooling. The sides $a$ and $b$ are then scraped to correspondingly increase the diameter between them.

It should be observed that the preferred forms of my invention are especially adapted for gyroscopic rotors, since the proper bearing surface is presented whether the thrust be up or down, right or left.

In accordance with the provisions of the patent statutes, I have herein described the principle of my invention, together with the apparatus which I now consider to represent the best embodiment thereof, but I deside to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim as new and desire to secure by Letters Patent is:

1. In combination, a journal subject to receive a load in a plurality of quadrants, a bearing for said journal adapted to receive lubricating fluid between said journal and bearing, the inner surface of said bearing being provided with longitudinal grooves dividing the bearing into sectors, means for supplying said grooves with lubricating fluid the curvature of the bearing surface between each adjacent pair of grooves being such as to maintain a film of uniform thickness between the journal and the bearing when the load is exerted on that sector and a greater clearance between the journal and the bearing at all other points.

2. A bearing comprising a plurality of bearing blocks bored to an internal diameter which exceeds the diameter of the journal only by an amount sufficient to maintain the proper thickness of the film of lubricating fluid at the working surface of said bearing and spaced to provide a larger clearance at the idle surfaces of the bearing thereby cooling the lubricating fluid.

3. A bearing having a plurality of portions of its inner circumference of a radius of curvature which exceeds the radius of the journal only by the uniform thickness of the supporting film of lubricating fluid.

4. In combination, a journal, a bearing thereof having an internal circumference comprising a plurality of sectors, said sectors having equal radii of curvature, said radii each being equal to the radius of said journal plus the thickness of the supporting film of lubricating fluid.

In testimony whereof I have affixed my signature.

ALEXANDER E. SCHEIN.